US011956208B2

(12) United States Patent
Kopp et al.

(10) Patent No.: US 11,956,208 B2
(45) Date of Patent: *Apr. 9, 2024

(54) GRAPHICAL REPRESENTATION OF SECURITY THREATS IN A NETWORK

(71) Applicant: Cisco Technology, Inc., San Jose, CA (US)

(72) Inventors: Martin Kopp, Lochovice (CZ); Lukas Machlica, Prague (CZ)

(73) Assignee: CISCO TECHNOLOGY, INC., San Jose, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/722,915

(22) Filed: Apr. 18, 2022

(65) Prior Publication Data

US 2022/0239630 A1    Jul. 28, 2022

Related U.S. Application Data

(63) Continuation of application No. 16/360,494, filed on Mar. 21, 2019, now Pat. No. 11,336,617.

(51) Int. Cl.
*H04L 9/40* (2022.01)
*G06T 11/20* (2006.01)

(52) U.S. Cl.
CPC .......... *H04L 63/02* (2013.01); *H04L 63/1425* (2013.01); *H04L 63/145* (2013.01); *G06T 11/206* (2013.01); *G06T 2200/24* (2013.01)

(58) Field of Classification Search
CPC .... H04L 63/02; H04L 63/1425; H04L 63/145
See application file for complete search history.

(56) References Cited

U.S. PATENT DOCUMENTS

| 7,624,448 | B2 | 11/2009 | Coffman |
| 9,432,393 | B2 | 8/2016 | Bartos et al. |
| 9,973,520 | B2 | 5/2018 | Pevny |
| 10,142,353 | B2 | 11/2018 | Yadav et al. |
| 10,177,998 | B2 | 1/2019 | Parandehgheibi et al. |
| 10,504,038 | B2 | 12/2019 | Franc et al. |
| 11,336,617 | B2 * | 5/2022 | Kopp .................. H04L 63/1425 |

(Continued)

OTHER PUBLICATIONS

Fernando Silveira et al., "URCA: Pulling out Anomalies by their Root Causes," 2010 Proceedings IEEE INFOCOM, Mar. 14-19, 2010, 9 pages.

*Primary Examiner* — Oleg Korsak
(74) *Attorney, Agent, or Firm* — Edell, Shapiro & Finnan, LLC

(57) ABSTRACT

A method includes, at a server in a network, detecting for a user device network incidents relating to one or more security threats in the network using a plurality of threat detectors over a predetermined time period, each of the network incidents including one or more behavior indicators; assigning the network incidents into one or more groups, wherein each group corresponds to a type of security threat; generating a graph for a particular group of the user device, wherein the graph includes a plurality of nodes each representing a behavior indicator in the particular group, and wherein generating the graph includes assigning an edge to connect two nodes of the plurality of nodes if the two nodes correspond to behavior indicators that belong to a same network incident; and displaying the graph on a graphical user interface for a user.

20 Claims, 9 Drawing Sheets

(56) References Cited

U.S. PATENT DOCUMENTS

| | | |
|---|---|---|
| 2007/0209075 A1 | 9/2007 | Coffman |
| 2017/0063905 A1 | 3/2017 | Muddu et al. |
| 2017/0134404 A1 | 5/2017 | Machlica et al. |
| 2017/0134415 A1 | 5/2017 | Muddu et al. |
| 2017/0324709 A1 | 11/2017 | Ahn et al. |
| 2018/0041528 A1 | 2/2018 | Machlica et al. |
| 2018/0198805 A1 | 7/2018 | Vejman et al. |
| 2018/0234445 A1 | 8/2018 | Bhatt et al. |
| 2018/0375884 A1 | 12/2018 | Kopp et al. |
| 2019/0253442 A1 | 8/2019 | Brabec et al. |

* cited by examiner

GRAPHICAL REPRESENTATION OF SECURITY THREATS IN A NETWORK

CROSS-REFERENCE TO RELATED APPLICATION

The present application is a continuation of U.S. patent application Ser. No. 16/360,494, filed on Mar. 21, 2019, now U.S. Pat. No. 11,336,617, issued May 17, 2022, entitled "Graphical Representation of Security Threats in a Network" which is incorporated by reference herein in its entirety and for all purposes.

TECHNICAL FIELD

The present disclosure relates to presenting security threats in a network in a graphical user interface to a user.

BACKGROUND

Malware is a threat and danger to computer and network users in all types of environments. Many systems have been developed to detect malware. For example, intrusion detection systems (IDS) are commonly used for detecting malware. Generally, an IDS detects malware based on one or more sets of different detectors/classifiers configured to detect different malware activities. A single security alert is generated based only on a decision of a single detector. When a user receives the alert, the user may take one or more measures to reduce the threat to a computer network system. For example, a user may elect to block a particular network port that is in communication with a Domain-Name Generating Algorithm (DGA) domain.

DESCRIPTION OF EXAMPLE EMBODIMENTS

Overview

Figure 1:
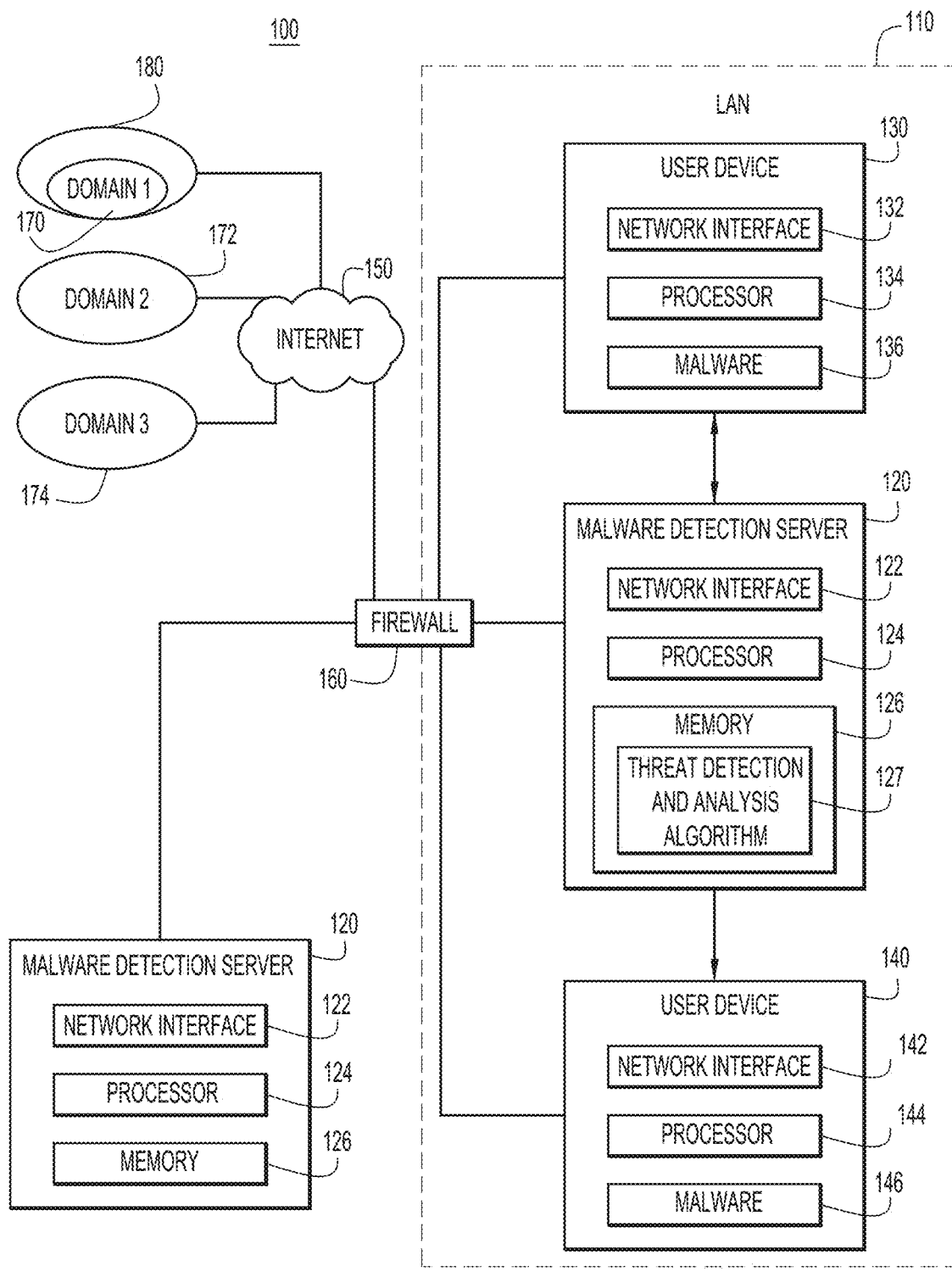
FIG. 1 depicts a system in which techniques for detecting and graphically analyzing malicious user behavior activities related to malware can be applied, according to an example embodiment.

Techniques for presenting graphical security threats in a graphical user interface are provided. A server in a network detects, for a user device, network incidents relating to one or more security threats in the network using a plurality of threat detectors over a predetermined time period. Each of the network incidents includes one or more behavior indicators. The server assigns the network incidents into one or more groups. Each group corresponds to a type of security threat. The server generates a graph for the user device. The graph includes a plurality of nodes each representing a behavior indicator detected by a corresponding one of the plurality of threat detectors. The server generates the graph by assigning an edge to connect two nodes of the plurality of nodes if the two nodes correspond to behavior indicators that belong to a same network incident and assigning no edge to connect two nodes of the plurality of nodes if the two nodes correspond to behavior indicators that do not belong to a same network incident. The server displays the graph on a graphical user interface for a user.

Example Embodiments

Machine learning-based intrusion detection systems have been adopted to detect security threats in computer network systems. Generally, an intrusion detection system can detect anomalies, and generate security alerts and network security incidents. Those alerts are presented to a user to indicate potential security threats. While an alert may pinpoint an infected device, contextual information that can be provided by the other detectors is neglected. A single alert typically contains little or no additional context about the potential threat. When multiple classifiers and/or anomaly detectors are deployed in the network, it could be burdensome for a user managing a computer network system to understand how to respond to a large number of alerts without a basic understanding of under what circumstances those alerts are generated. This problem can be intensified when the classifiers and/or detectors use external threat intelligence such as third party blacklists or signatures in dealing with zero-day attacks. This is because detection of security threats is based on blacklisting of domains, which do not provide additional details on the threat even if the threat is in most cases well known.

The contextual information related to the threats is useful to understand the threat and its impact, and to take proper actions. Techniques disclosed herein can provide improved contextual information about the detected security threats to user to enable the user to take appropriate measures countering the threats and/or to improve the intrusion detection system. Techniques disclosed herein include insights of multiple detectors in one graphical representation to generate a unified overview of a detected threat.

As used in this disclosure, user behavior indicators include actions performed by a user device including work stations, desktop computers, laptop computers, smart phones, tablets, and generally any other electronic devices that can be used to access networks. Moreover, user behavior indicators may include actions performed by software running in a virtualized user space in a data center/cloud computing environment. Examples of certain user behavior indicators may indicate suspicious behavior activities related to malware, such as network traffic related to: an Internet Protocol (IP) address check, a destination with low popularity, "TOR" (anonymous web-browsing) usage, communication with a DGA domain, a connection check, use of online storage services (e.g., Dropbox™), and so on.

Reference is first made to FIG. 1. FIG. 1 depicts a system 100 in which techniques for detecting and graphically presenting malicious user behavior activities related to malware can be applied, according to an example embodiment. The system 100 includes a network 110, which further includes a malware detection server 120 and a number of user devices, represented in FIG. 1 by user devices 130 and 140. The network 110 may be, for example, a local area network (LAN), which may be an enterprise network or home network. In some embodiments, the malware detection server 120 may also be deployed independently of the cloud (i.e., off-cloud, such as on-premises) or in the cloud (outside of the network 110). Thus, in FIG. 1, the malware detection server 120 is shown either inside or outside of network 110. More generally, the malware detection server 120 may be referred to as a "server" that is configured to detect certain user behavior indicators in the network 110.

Regardless of its location, the malware detection server 120 includes a network interface 122 configured to provide connectivity to the Internet 150 through a firewall 160 of the network 110. In one example, the network interface 122 may take the form of one or more network interface cards. For example, the network interface 122 may receive network traffic from the user devices 130 and 140 and from firewall 160, and receive traffic into the network 110 from outside (the Internet 150) and send traffic out of the network 110 to the Internet 150.

The malware detection server 120 further includes a processor 124 configured to execute instructions stored in memory 126. The memory 126 may store instructions for a threat detection/analysis algorithm 127 configured to perform operations disclosed herein.

The memory 126 may include read only memory (ROM), random access memory (RAM), magnetic disk storage media devices, optical storage media devices, flash memory devices, electrical, optical or other physical/tangible memory storage devices. The memory 126 stores the threat detection/analysis algorithm 127 that includes computer-readable instructions for detecting behavior indicators relating to one or more security threats in the network 110 and for generating graphical representations in a graphical user interface based on the detected behavior indicators.

The functions of the processor 124 may be implemented by logic encoded in one or more tangible (non-transitory) computer-readable storage media (e.g., embedded logic such as an application specific integrated circuit, digital signal processor instructions, software that is executed by a processor, etc.), wherein the memory 126 stores data used for the operations described herein and stores software or processor executable instructions that are executed to carry out the operations described herein.

In some embodiments, the processor 124 may be embodied by digital logic gates in a fixed or programmable digital logic integrated circuit, which digital logic gates are configured to perform operations described herein. In general, the threat detection/analysis algorithm 127 may be embodied in one or more computer-readable storage media encoded with software comprising computer executable instructions and when the software is executed operable to perform the operations described herein.

Still referring to FIG. 1, for simplicity, the network 110 is shown only with two user devices (user devices 130 and 140); however, the network 110 may be of any desirable size and including hundreds or thousands of user device. For example, the network 110 may be a university network of any size, a corporate network of any size, or any other such network. User device 130 and user device 140 include network interface equipment 132 and network interface equipment 142, respectively, to provide network connectivity through firewall 160 such that user devices 130 and 140 may connect to a number of domains outside of the network 110 via the Internet 150. For example, user devices 130 and 140 may connect to domain 1 shown at reference numeral 170, domain 2 shown at reference numeral 172, and domain 3 shown at reference numeral 174, at least one of which may be hosted by a malicious user or server, such as a Command & Control (C&C) Server 180 (i.e., a botnet server), infected by malware, or otherwise used to generate malicious network traffic. In some embodiments, the user devices 130 and 140 may route their network traffic through the malware detection server 120 through their respective link to the malware detection server 120. The firewall 160 generates logs of network communications and may send those logs to the malware detection server 120 or otherwise store the logs at a location accessible by the malware detection server 120. The user device 130 may also include a processor 134 and the user device 140 includes a processor 144.

In FIG. 1, malware 136 resides and is executed on user device 130 while malware 146 resides and is executed on user device 140. As used herein, malware 136 and malware 146 refer to executable files that each cause a computer/processor to execute instructions. The malware may be in a machine language, interpreted language, intermediate language, script language or any other language now known or hereinafter developed that causes a computer/processor to execute instructions. In some embodiments, network 110 may include, but is not limited to, a plurality of user/computing devices, servers and other network devices that may or may not be infected by malware.

Figure 2:
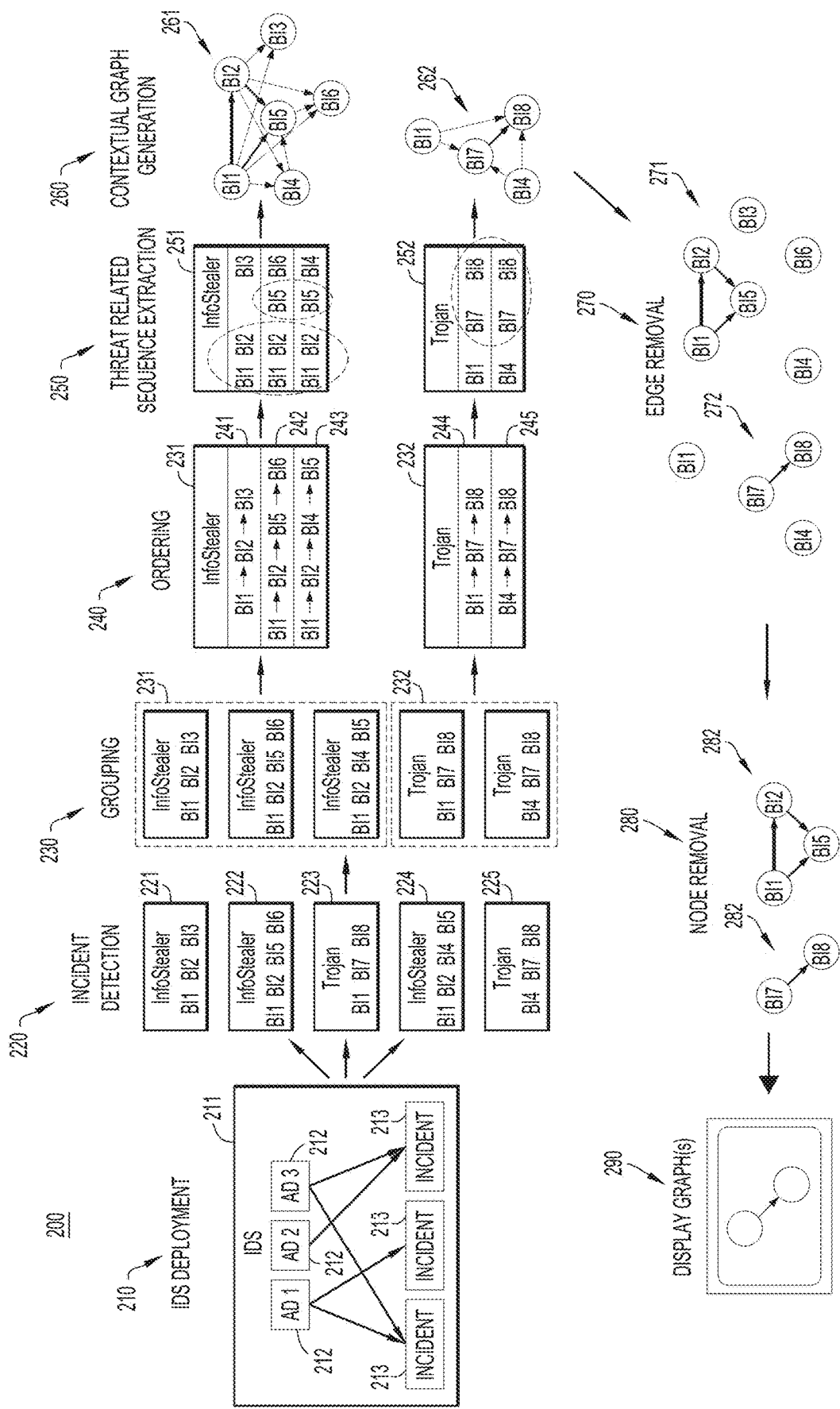
FIG. 2 is a flow diagram illustrating a method for generating graphs that include contextual information based on behavior indicators detected by a threat detection system for user devices in a network, according to an example embodiment.

FIG. 2 is a flow diagram illustrating a method 200 for generating graphs that include contextual information based on behavior indicators detected by a threat detection system for user devices in a network, according to an example embodiment. For example, the method 200 may be performed by a server, e.g., the malware detection server 120 in FIG. 1. At 210, a threat/intrusion detection system (IDS) 211 is deployed in a network to monitor traffic for a plurality of user devices. For example, the IDS 211 may be deployed in the malware detection server 120 shown in FIG. 1. The IDS 211 may include a plurality of anomaly detectors 212, denoted AD1, AD2, and AD3 configured to detect anomalies/incidents 213 in the network. It is to be understood that although three anomaly detectors 212 are illustrated in FIG. 2, more or fewer anomaly detectors may be included in the IDS 211. In some embodiments, the anomaly detectors 212 are configured to detect incidents related to individual user devices.

With the deployment of the IDS 211, at 220, over a period of time, the anomaly detectors 212 may detect a plurality of incidents 221-225 for a single user device. The detected incidents for one user device may include incidents of different threat types, e.g. information stealer, ad injector, etc. Based on prior intelligence for security threat, each of the incidents 221-225 can be associated with a particular security threat. For example, incidents 221, 222, and 224 are associated with a threat called "InfoStealer" (Information Stealer), while incidents 223 and 225 are associated with a threat called a "Trojan." Each incident includes a set of behavior indicators. Example behavior indicators include network traffic related to IP address checks, communications with a destination with low popularity, TOR web browser usage, use of a DGA, a connection check, use of online storage services, software updating, downloading of graphical images, etc., which are observed/detected while the user device is active. For example, incident 221 includes behavior indicators BI1, BI2, and BI3; incident 222 includes behavior indicators BI1, BI2, BI5, and BI6; incident 223 includes behavior indicators BI1, BI7, and BI8; incident 224 includes behavior indicators BI1, BI2, BI4, and BI5; and incident 225 includes behavior indicators BI4, BI7, and BI8.

At 230, the malware detection server assigns/groups the incidents 221-225 into one or more security threat groups. In some embodiments, each group corresponds to a type of security threat. For example, in FIG. 2, the incidents 221, 222, and 224 are assigned to the same group 231 ("InfoStealer" group), and the incidents 223 and 225 are assigned to the same group 232 ("Trojan" group). For this particular user device, the malware detection server 120 identifies two groups for the incidents and can detect more or less groups based on its threat detectors. Assigning incidents and their behavior indicators to individual security threat group(s) enables correlating the context represented by the behavior indicators to a single threat, not to all the malicious behaviors detected by an IDS, which may be diverse and cause undesirable noise. In other words, the grouping operation 230 allows contextual information that is to be shown to a user to focus on a single threat/campaign and does not involve behaviors from many different threats. In some embodiments, the grouping/assigning may be based on classifications provided by an IDS. A single user device may be infected by multiple different threats, which could distort the contextual information to be extracted if incidents are not classified based on the types of the threats. In some embodiments, the influence of different threats affecting a single user device may be canceled out when a large set of incidents is collected/detected over a longer time period. For example, all domains from a blacklist can be found to be related to one malware family.

In some embodiments, at 240, the malware detection server orders the behavior indicators in each incident based on occurrences of the behavior indicators in time to generate a behavior indicator sequence for each group. For example, in incident 221, the behavior indicators BI1, BI2, and BI3 are ordered in a behavior indicator sequence 241 (BI1→BI2→BI3) based on an order in which they are detected in time. In the illustrated example, one behavior indicator sequence is a collection of BIs for a single incident of a single user device. Similarly, the malware detection server generates a behavior indicator sequence 242 (BI1→BI2→BI5→BI6) for the incident 222 in the group 231; a behavior indicator sequence 243 (BI1→BI2→BI4→BI5) for the incident 224 in the group 231; a behavior indicator sequence 244 (BI1→BI7→BI8) for the incident 223 in the group 232; and a behavior indicator sequence 245 (BI4→BI7→BI8) for the incident 225 in the group 232. In some embodiments, each behavior indicator may be appended with a timestamp mark indicating when it is detected to facilitate the generation of the behavior indicator sequences. The ordering of the behavior indicators may facilitate generating of a graph for the user device as will be explained below.

In some embodiments, at 250, the malware detection server performs threat related sequence extraction. This involves identifying a particular behavior indicator sequence of the behavior indicator sequences, as a threat-related sequence based on co-occurrence of behavior indicators in the particular behavior indicator sequence.

Some behavior indicators may be generic or frequently observable in both legitimate and malicious behaviors, e.g., indicators of file download, multi-media streaming, wordpress management, etc. The techniques disclosed herein integrate this kind of indicators in the contextual information to explain, or give context to, an incident. For example, the indicator of file-download may distinguish between file/binary-based and file-less infection. In some cases, this slight difference may lead to different mitigation actions. The malware detection server is configured to use not only the presence of an indicator in a sequence, but the co-occurrence with other indicators in the indicator-sequence to provide contextual information to a user. For example, consider the following two behavior indicator sequences:

S_1=[file-download, multi-media streaming, adobe-flash, skype usage], and

S_2=[file-download, unexpected-user-agent, adobe-flash, sinkhole DNS traffic].

Sequence S_1 is extracted from a single user device's network traffic, and does not indicate that it relates to malware activities and may be common for many users. On the other hand, sequence S_2 is highly suspicious. Although the behavior indicators including file-download and adobe-flash are present in both sequences, they are highly descriptive only in sequence S_2. This operation enables extracting/identifying sequences similar to S_2 and at the same time filters out sequences similar to S_1. That is, behavior indicator sequences that are likely to occur on infected devices are extracted/kept, while sequences common for benign traffic are filtered out.

In some embodiments, the malware detection server is configured to identify co-occurring behavior indicators that are common in at least two incidents in a particular group. For example, the behavior indicators in the group 231 may be reorganized so that the same behavior indicator in each incident are aligned in the same line (e.g., vertically next to each other) to generate an updated group 251. The updated group 251 facilitates identification of co-occurrence of behavior indicators in the incidents. For example, behavior indicators BI1 and BI2 co-occur in three incidents 221, 222, and 224; behavior indicators BI1 and BI5 co-occur in two incidents 222 and 224; and behavior indicators BI2 and BI5 co-occur in two incidents 222 and 224. Further, the updated group 251 allows identification of a behavior indicator that is included in one incident but is not included in any other incident in the group, e.g., BI3 in the incident 221, BI6 in the incident 222, and BI4 in the incident 224. This operation (mining) allows identifying transactions (behavior indicators) from user traffic that are useful to detect a security threat. In some embodiments, a behavior indicator that is included in one incident but is not included in any other incident in a group may be deleted from the group and is not used for generating a graph for the group as will be explained below. For example, BI3, BI6, and BI4 may be deleted from the updated group 251 and are not used for generating a graph for the updated group 251. Similarly, the malware detection server may generate an updated group 252 for the "Trojan" group.

At 260, the malware detection server generates one or more contextual graphs for the user device. For example, the malware detection server may generate a graph for each group corresponding to a particular type of security threat.

A contextual graph includes a plurality of nodes each representing a behavior indicator in a particular group.

When generating a graph, the malware detection server assigns an edge to connect two nodes of the plurality of nodes if the two nodes correspond to behavior indicators that belong to a same incident and assigns no edge to connect two nodes of the plurality of nodes if the two nodes correspond to behavior indicators that do not belong to a same incident in the particular group. For example, as shown in FIG. 2, the malware detection server generates a graph 261 for the group 231 corresponding to "InfoStealer" group 231. The graph 261 includes six nodes representing the behavior indicators BI1-BI6 in the group 231. BI1 co-occurs with BI2 and BI3 in incident 221 such that two edges are assigned to connect BI1 to BI2 and to connect BI1 to BI3. Similarly, BI1 co-occurs with BI5 and BI6 in incident 222 such that two edges are assigned to connect BI1 to BI5 and to connect BI1 to BI6. Further, BI1 co-occurs with BI4 in incident 224 such that an edge is assigned to connect BI1 to BI4. On the other hand, BI3 does not co-occur with any of BI4-BI6 in the incidents 221, 222, and 224 of the group 231 such that no edge is assigned to connect BI3 to BI4-BI6.

In some embodiments, a direction may be assigned to an edge to indicate a time order of occurrence of the nodes. For example, in the graph 261, an arrow pointing from BI1 to BI2 may be assigned to the edge connecting BI1 to BI2 based on their time sequence in the behavior indicator sequence 241. Similar operations can be performed for all edges in the graph 261 such that an arrow is assigned to each of the edges pointing from BI1 to BI2-BI6, an arrow is assigned to each of the edges pointing from BI2 to BI3-BI6, an arrow is assigned to the edge pointing from BI4 to BI5, and an arrow is assigned to the edge pointing from BI5 to BI6.

In some embodiments, an edge may be assigned a weight to indicate a number of co-occurrences of two nodes in the one or more groups. For example, nodes BI1 and BI2 co-occur three times in the group 231, while nodes BI2 and BI3 co-occur once in the group 231. If the edge connecting nodes BI2 and BI3 is assigned a weight of one unit, the edge connecting nodes BI1 and BI2 can be assigned a weight of three units. In some embodiments, a weight of an edge may be represented by a width of the edge. For example, as shown in the graph 261, a width for the edge connecting nodes BI1 and BI2 is three times a width for the edge connecting nodes BI2 and BI3.

With continued reference to FIG. 2, a graph 262 is generated for the group 232 corresponding to "Trojan" group. The graph 262 includes four nodes representing behavior indicators BI1, BI4, BI7, and BI8 in the group 232. An edge is assigned between BI1 and BI7 because BI1 and BI7 both belong to the incident 223. An edge is also assigned between BI1 and BI8 because BI1 and BI8 both belong to the incident 223. Similarly, an edge is assigned between BI4 and BI7 (incident 225), between BI4 and BI8 (incident 225), and between BI7 and BI8 (incidents 223 and 225). No edge is assigned to connect BI1 and BI4 because they do not belong to a same incident in the group. In some embodiments, each of the edges may be assigned a direction based on a time order of occurrence of the two nodes connected by the edge in the graph representing a time order of observation of the behavior indicators associated with the two nodes. In some embodiments, each of the edges in the graph 262 may be weighted based on a number of co-occurrences of the two nodes in the group 232. For example, BI7 and BI8 co-occur twice while BI1 and BI7 co-occur once in the group 232. Based on this information, if the edge connecting BI1 and BI7 is assigned a weight of one unit, the edge connecting BI7 and BI8 can be assigned a weight of two units. The edge connecting BI7 and BI8 is shown in the graph 262 twice as wide as the edge connecting BI1 and BI7.

The graphs generated using the techniques disclosed herein include not only information of behavior indicators from one security-threat incident but also information from other incident(s) of the same threat type, and provide improved contextual information based on multiple incidents of the same type of threat.

In some embodiments, a node corresponding to a particular behavior indicator that is included in an incident and is not included in any other incident of a group may be removed from the graph. For example, the node corresponding to BI3 may be removed from the graph 261 as BI3 is included in incident 221 and not included in any other incidents in the group 231. The operation can simplify a graph when a large number of behavior indicators/incidents are included in a group and present a concise graph that focuses on showing more frequent behavior indicators.

In some embodiments, an edge may be removed from a graph. When a graph contains a large number of nodes with many edges (connections), it may be desirable to remove some of the edges with less usefulness to reduce the complexity of the graph. In some embodiments, an edge may be removed from a graph if a weight of the edge is less than a threshold. For example, at 270, the malware detection server may be configured to remove an edge that has a weight less than two units in the graph 261. As a result, the edges that are between BI1 and BI3, between BI1 and BI4, between BI1 and BI5, between BI2 and BI3, between BI2 and BI4, between BI2 and BI6, between BI4 and BI5, and between BI5 and BI6, are removed from the graph 261 to generate an updated graph 271. Similarly, the edges that are between BI1 and BI7, between BI1 and BI8, between BI4 and BI7, and between BI4 and BI8, may be removed from graph 262 to generate an updated graph 272. In some embodiments, the nodes that are connected by the removed edges are kept in the updated graphs to provide improved contextual information, even though the removed nodes are not "connected" to any other nodes.

Updated graphs 271 and 272 show improved contextual information about their respective groups 231 and 232 with less complexity in the graphs. The updated graphs allow for a server or user/administrator to identify more useful behavior indicators/nodes that are connected by edges for understanding the behavior pattern of the threat, and to identify behavior indicators/nodes of less use because they have no edge connected to them. In some embodiments, based on the updated graphs, the malware detection server is able to identify and disable less useful threat detectors in the IDS 211 to conserve resources. For example, the malware detection server can identify a particular threat detector in the IDS 211 that detects the behavior indicator represented by the node BI3 that has no edge connected to it in the updated graph 271. The malware detection server can then disable the particular threat detector to conserve resources.

In some embodiments, the graphs 261, 262, 271, and 272 may be employed to identify one or more redundant threat detectors in the IDS 211. For example, a graph may include one or more edges that are assigned with heavy weights, which indicates that the nodes connected by the edges co-occur many times in the threat group/type represented by the graph. This may result from multiple threat detectors in the IDS detecting the same threat behaviors, which may indicate that some of the threat detectors are redundant. In some embodiments, it may be desirable to identify those redundant threat detectors and disable them to conserve resources and to improve detection efficiency.

In some embodiments, as shown at 280, a graph may be generated by removing nodes that have no edge connected to them to show core behaviors of a type of threat. For example, nodes BI3, BI4, and BI6 may be removed from the updated graph 271 to generate a graph 281 that includes nodes BI1, BI2, and BI5 connected to each other by edges. Based on the graph 281, the malware detection server is configured to learn (using machine learning) that an "InfoStealer" threat is likely to include behaviors BI1, BI2, and BI5, and uses it as a rule to monitor future network traffic to detect a potential "InfoStealer" threat. Similarly, nodes BI1 and BI4 may be removed from the updated graph 272 to generate a graph 282 that includes nodes BI7 and BI8 connected to each other by an edge. Based on the graph 282, the malware detection server is configured to learn that a "Trojan" threat is likely to include behaviors BI7 and BI8, and uses it as a rule to monitor future network traffic to detect a potential "Trojan" threat.

At 290, the malware detection server is configured to display a graph on a graphical user interface for a user. For example, the graphs generated at 260, 270, and 280 may be displayed on a graphical user interface, to provide improved contextual information for a user/administrator. In some embodiments, the graphs may be displayed individually. In other embodiments, the graphs may be displayed together to show multiple threat types at once. For example, the graphs 261 and 262 may be combined to form a single graph that includes two types of threats infecting the user device.

In some embodiments, the malware detection server may identify similar user devices based on graphs generated for the user devices. Similar user devices may have similar hardware and software configurations, and thus may be prone to be infected by similar malware. In addition to blocking the threat of malware, the techniques disclosed herein can identify similar user devices based on the graphs for the user devices and apply a same counter-threat action for those similar user devices. For example, the malware detection server may generate a first graph for a first user device and a second graph for a second user device. The malware detection server then generates a similarity score by comparing the first graph to the second graph. The malware detection server then determines whether the similarity score is greater than a threshold. In response to determining that the similarity score is greater than the threshold, the malware detection server determines that the second user device is similar to the first user device. The malware detection server may then apply a same counter-threat measure to the first user device and the second user device. This may streamline measures taken by the malware detection server to counter the threats in the network.

Figure 3:
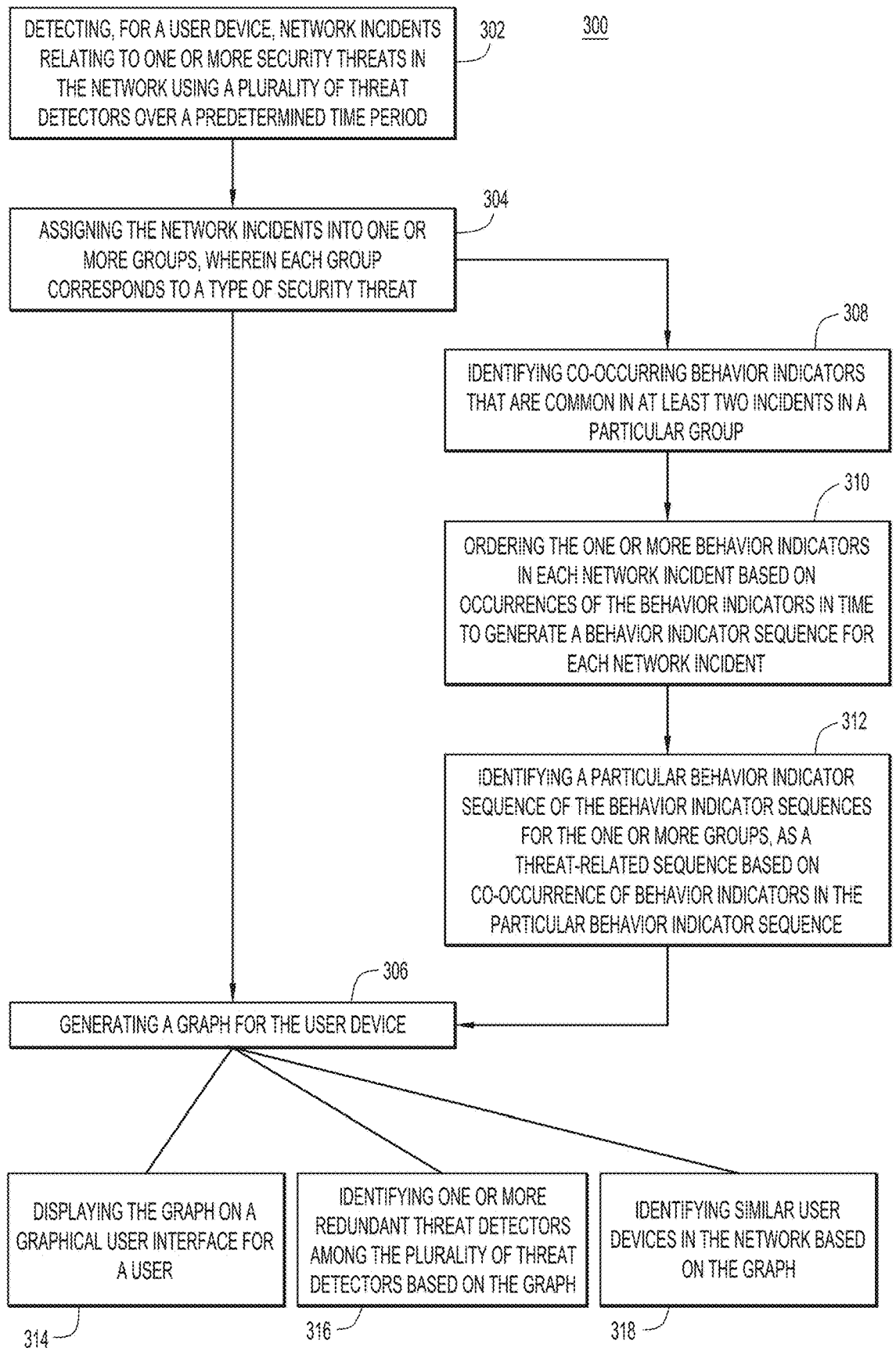
FIG. 3 depicts a flow chart of a method for presenting one or more security threats of a network in a graphical user interface, according to an example embodiment.

Reference is made to FIG. 3. FIG. 3 depicts a flow chart of a method 300 for presenting one or more security threats of a network in a graphical user interface, according to an example embodiment. For example, the method 300 may be performed by a server, such as the malware detection server 120 in FIG. 1. At 302, the server detects, for a user device, network incidents relating to one or more security threats in the network using a plurality of threat detectors over a predetermined time period. For example, the server may be deployed to the network using a threat detection system that includes a plurality of threat detectors to monitor traffic from or to the user device. In some embodiments, the predetermined time period may be 0.5, 1, or two days, for example. The monitoring results in each time period is saved as a transaction for the user device. Within each transaction, the plurality of threat detectors may detect one or more network incidents. The server is also configured to determine one or more behavior indicators included in each of the incidents.

At 304, the server assigns the network incidents into one or more groups, each corresponding to a type of security threat. As a result, each group for the user device may include one or more incidents. The assigning operation allows contextual information to focus on a single threat/campaign to reduce complexity of analyzing many different threats at once. For example, this operation allows analyzing and presenting contextual information related to a single threat, e.g., a banking Trojan.

At 306, the server generates a graph for a particular group for the user device. The graph includes a plurality of nodes each representing a behavior indicator in the particular group. The server is configured to generate the graph by assigning an edge to connect two nodes of the plurality of nodes if the two nodes correspond to behavior indicators that belong to a same incident and assigning no edge to connect two nodes of the plurality of nodes if the two nodes correspond to behavior indicators that do not belong to a same incident.

In some embodiments, the server is configured to perform other operations before generating a graph. For example, at 308, the server is configured to identify co-occurring behavior indicators that are common in at least two incidents in a particular group. As discussed above, two nodes corresponding to co-occurring behavior indicators in one incident are assigned an edge to connect the nodes. Identifying co-occurring behavior indicators that are common in at least two incidents helps the server to identify frequent behavior indicators that likely exist in a particular security threat. Operation 308 may also allow the server to assign weights to the edges when generating the graph for the particular group.

At 310, the server orders the one or more behavior indicators in each network incident based on occurrences of the behavior indicators in time to generate a behavior indicator sequence for each network incident. The order of behavior indicators in times as they are detected may be a useful insight into understanding a particular threat. This operation could also be a preparatory step for assigning a direction to an edge when generating a graph for the particular group.

At 312, the server identifies a particular behavior indicator sequence of the behavior indicator sequences for the one or more groups, as a threat-related sequence based on co-occurrence of behavior indicators in the particular behavior indicator sequence. Behavior indicators may be generic or common in both legitimate and malicious incidents, e.g., indicators of file download, multi-media streaming, etc. The server is configured to use, in addition to the presence of an indicator in a sequence, the co-occurrence with other indicators in the indicator-sequence to identify a threat-related sequence. In some embodiments, generating a graph for a particular group is based on identification of the threat-related sequence in the group. Sequences that are not identified as threat-related sequences are not used for generating the graph.

At 314, after one or more graphs are generated for one or more types of threats/groups, the server is configured to display the one or more graphs in a graphical user interface for a user. For example, the server may cause a screen to display the graphs to the user. The graphs generated according to the techniques disclosed herein include improved contextual information to enable the user to understand a behavior pattern of a threat. In some embodiments, the graphs may allow the user to develop a counter-threat measure tailored to the behavior pattern of the threat.

In some embodiments, at 316 the server is configured to identify one or more redundant threat detectors among the plurality of threat detectors based on the graph. For example, a graph may include edges that are assigned with heavy weights. This may indicate that the nodes connected by the edges co-occur many times in the threat group/type represented by the graph. This could be a result of multiple threat detectors deployed in the system detecting the same threat behaviors, which may indicate that the threat detectors are redundant to each other. In some embodiments, the server is configured to identify those redundant threat detectors and disable some of them to conserve resources and to improve detection efficiency.

In some embodiments, at 318 the server is configured to identify similar user devices in the network based on the graphs. Similar user devices have similar hardware and software, and thus may be infected by similar malware. The server can compare graphs for different user devices, and determine that user devices are similar when the graphs generated for those user devices are similar.

Figure 4:
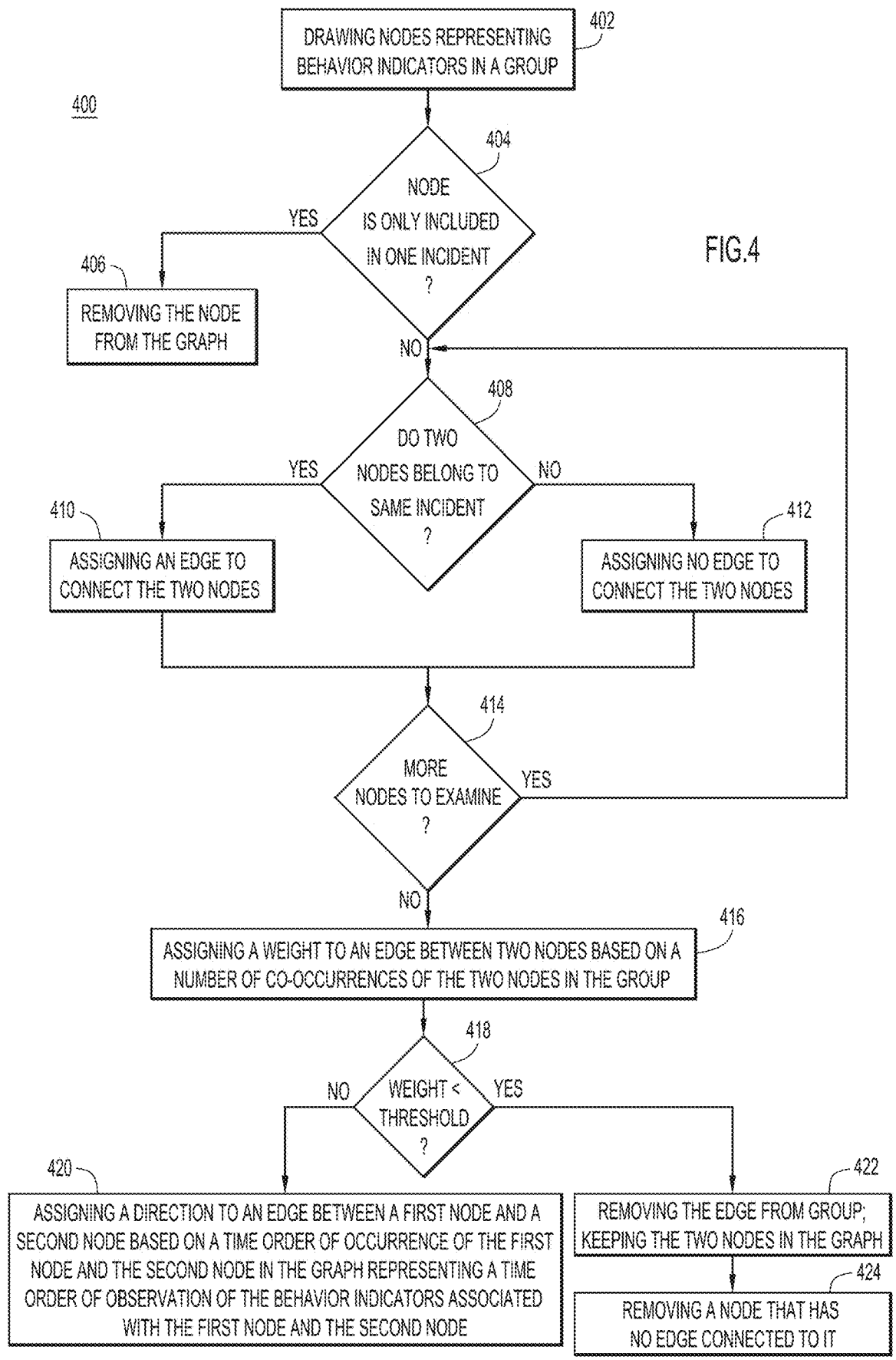
FIG. 4 depicts a flow chart of a method for generating a graph of a security threat for a user device as depicted in operation 306 in FIG. 3, according to an example embodiment.

Reference is made to FIG. 4. FIG. 4 depicts a flow chart of a method 400 for generating a graph of a security threat for a user device as depicted in operation 306 in FIG. 3, according to an example embodiment. For example, the method 400 may be performed by a server, such as the malware detection server 120 in FIG. 1. At 402, the server draws nodes representing behavior indicators in the group. The group includes a plurality of incidents that correspond to a same type of network security threat such as Trojan or information stealer. Each of the incidents includes a plurality of behavior indicators indicating suspicious behaviors related to malware, such as network traffic related to: an IP address check, a destination with low popularity, TOR usage, use of DGAs, a connection check, or use of online storage services.

At 404, the server determines whether a node representing a particular behavior indicator is included in one incident and not included in any other incident in the group. In some embodiments, a group may include a large number of behavior indicators. Although having many nodes in a graph can provide improved contextual information, including a large number of nodes in the graph can introduce too much complexity or noise for a user to understand the behavior pattern of the threat. The server can find nodes that are of less utility by determining whether a node is included in one incident and not included in any other incident in the group. If so (Yes at 404), the server can determine that the node is less useful in providing contextual information, and at 406, the server removes the node from the graph. If the server determines that the node is included in a plurality of incidents in the group (No at 404), at 408 the server determines whether two nodes of the graph belong to a same incident. If the two nodes of the graph belong to a same incident (Yes at 408), at 410 the server assigns/draws an edge to connect those two nodes. If the two nodes of the graph do not belong to a same incident (No at 408), at 412 the server assigns/draws no edge to connect those two nodes.

Following 410 and 412, at 414 the server determines whether there are more nodes for which it needs to be determined if they belong to a same incident. If there are more nodes that need to be processed (Yes at 414), the method 400 returns to 408. If there are no more nodes that need to be processed (No at 414), at 416 the server assigns a weight to an edge between two nodes based on a number of co-occurrences of the two nodes in the group. In some embodiments, the server may assign a weight to an edge proportional to the number of co-occurrences of the two nodes in the group. For example, if the two nodes co-occur in one incident in the group, the server assigns a weight of one unit to the edge connecting the two nodes, and if the two nodes co-occur in five incidents in the group, the server assigns a weight of five units to the edge connecting the two nodes. In some embodiments, the server may adopt a non-linear weight assignment to the edges in the graph.

At 418, the server determines whether a weight for an edge in the graph is less than a threshold. In some embodiments, when the graph contains a large number of nodes and edges, it may be desirable to remove some of the edges with less usefulness to focus on the core pattern of a security threat. For example, the server may determine that if a number of nodes or edges of a graph exceeds a predetermined threshold, the server is configured to remove edges that have weights less than a threshold, e.g., one unit or other suitable weight units.

In some embodiments, if the server determines that the weight for the edge in the graph is not less than the threshold (No at 418), at 420 the server assigns a direction to the edge that connects a first node to a second node based on a time order of occurrence of the first node and the second node in the graph representing a time order of observation of the behavior indicators associated with the first node and the second node. This operation generates a graph with nodes and arrows to show the behavior sequence in a time order. Adding directions to the edges in the graph (using arrows) provides more contextual information for understanding the behavior pattern of a security threat.

If the server determines that the weight for the edge in the graph is less than the threshold (Yes at 418), at 422 the server removes the edge from the graph. In some embodiments, the server keeps the two nodes, which had been connected by the removed edge, in the graph. These operations provide improved contextual information about the security threat in question. For example, after an edge is removed, one (or both) of the nodes that are connected by the removed edge may become an isolated node, i.e., no edge is connected to it. A node without any edge connected to it may indicate that the behavior indictor corresponding to the node is of less use to explain the security threat. The server may be configured to identify a threat detector that detects the behavior indictor and disable the threat detector to conserve resources. In some embodiments, at 424 the server may further be configured to remove a node that has no edge connected to it. Removing a node that has no edge connected to it allows the server to display a concise graph that focuses on the core behavior pattern of the security threat.

Figure 5:
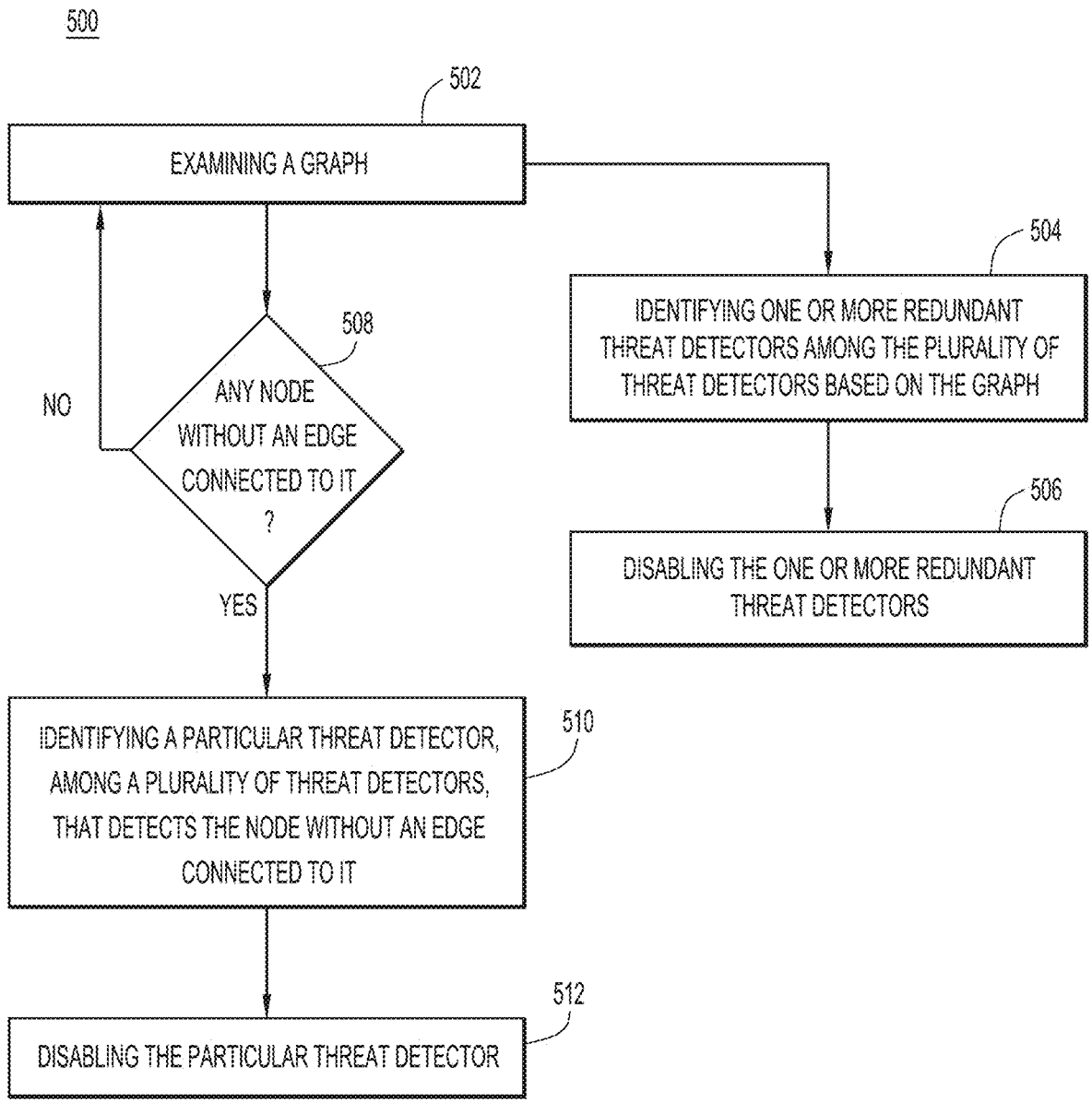
FIG. 5 depicts a flow chart of a method for using a graph indicating one or more security threats for a user device to improve a security threat detection system, according to an example embodiment.

FIG. 5 depicts a flow chart of a method 500 for using a graph indicating one or more security threats to improve a security threat detection system, according to an example embodiment. For example, the method 500 may be performed by a server, such as the malware detection server 120 in FIG. 1. At 502, the server examines a graph that indicates one or more types of security threats for a user device. The graph includes nodes representing behavior indicators detected by a plurality of threat detectors deployed in the network to monitor traffic for the user device. The graph also includes edges connecting the nodes that co-occur in one network incident. The edges may have different widths indicating a number of co-occurrences of the nodes.

At 504, the server identifies one or more redundant threat detectors among the plurality of threat detectors based on the graph. For example, a graph may include one or more edges that are assigned with heavy weight, e.g., drawn with a large width. An edge with a large width/weight may indicate that the nodes connected by the edge co-occur many times in the threat group/type represented by the graph, which may indicate that multiple threat detectors in the threat detection system are able to detect the same threat behaviors. When this occurs, some of the threat detectors may be deemed redundant. At 506, once the server identifies the redundant threat detectors, the server may disable them to conserve resources and to improve detection efficiency.

In some embodiments, at 508 the server determines whether any node (isolated node) in the graph is without an edge connected to it. Although an isolated node in the graph indicates that the security threat representing by the graph may include the behavior indicator representing by the isolated node, the isolated node is less useful in understanding the behavior pattern of the threat. If the server identifies an isolated node (Yes at 508), at 510, the server identifies a particular threat detector, among the plurality of threat detectors, that detects the isolated node. As this node is less useful in understanding the behavior pattern of the threat, at 512, the server disables the particular threat detector that detects the isolated node (behavior indicator) to conserve resources. If the server does not identify an isolated node (No at 508), the method 500 returns to operation 502.

Figure 6:
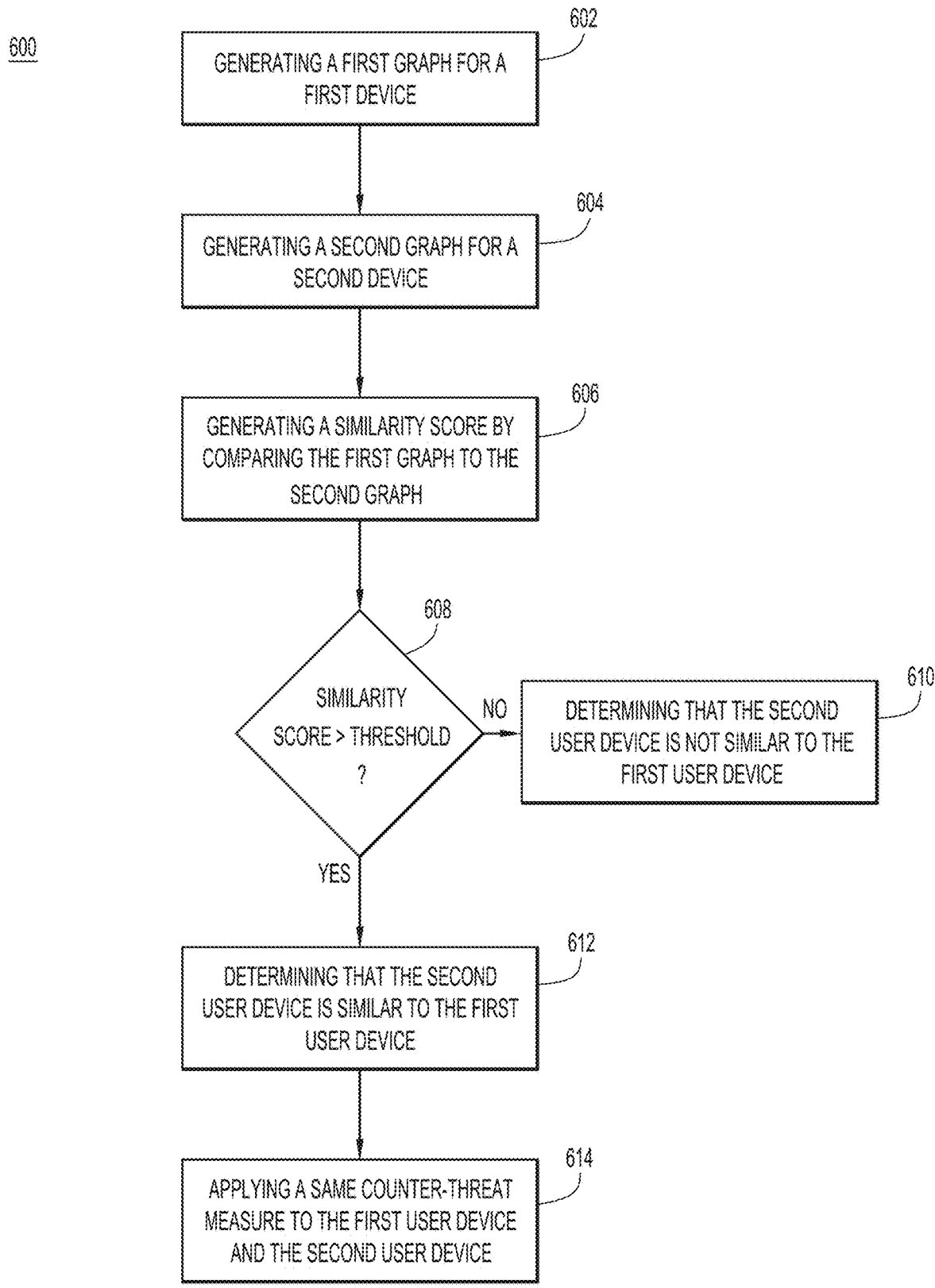
FIG. 6 depicts a flow chart of a method for using graphs indicating one or more security threats for user devices to find similar user devices, according to an example embodiment.

FIG. 6 depicts a flow chart of a method 600 for using graphs indicating one or more security threats for user devices to find similar user devices, according to an example embodiment. For example, the method 600 may be performed by a server, such as the malware detection server 120 in FIG. 1. Because similar user devices may have similar hardware and software, they may be infected by similar malware. Based on this observation, at 602, the server generates a first graph indicating a security threat for a first user device. At 604, the server generates a second graph indicating a security threat for a second user device. At 606, the server generates a similarity score by comparing the first graph to the second graph. For example, the server may compare attributes of the graphs such as a number of nodes, a number of edges, weights of the edges, directions of the edges, nodes without a connected edge, etc., to determine a similarity score for the first user device and the second user device.

At 608, the server determines whether the similarity score is greater than a threshold. If the server determines that the similarity score is not greater than the threshold, at 610 the server determines that the second user device is not similar to the first user device. If the server determines that the similarity score is greater than the threshold, at 612 the server determines that the second user device is similar to the first user device. In some embodiments, at 614, after the server determines that the similarity score is greater than the threshold, the server is configured to apply a same counter-threat measure to the first user device and the second user device. This can reduce the burden of the server in developing different counter-threat measurements for individual user devices.

Figure 7:
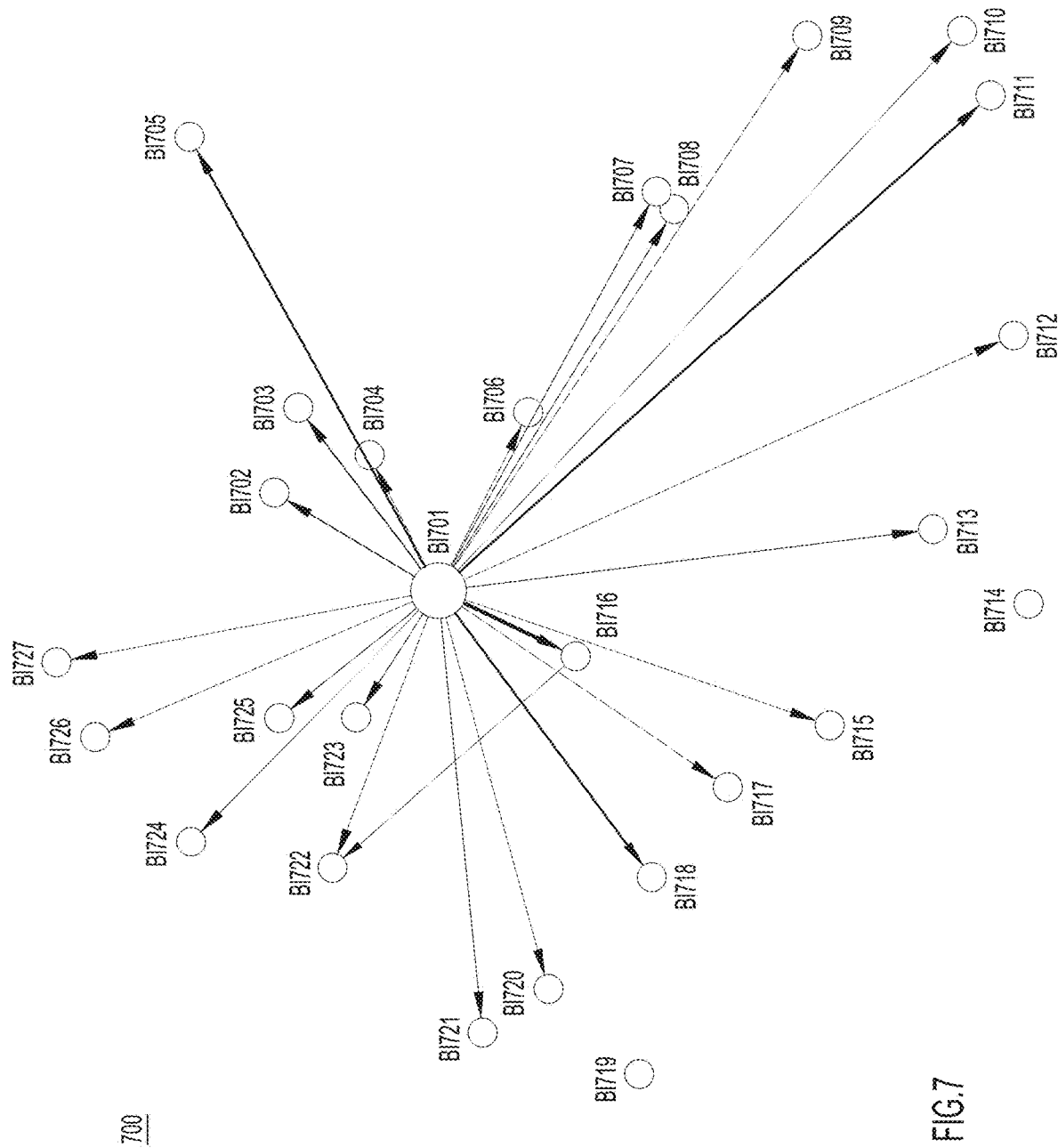
FIG. 7 illustrates a graph generated using the techniques disclosed herein for a type of security threat for a user device, according to an example embodiment.

FIG. 7 illustrates a graph 700 generated using the techniques disclosed herein for a type of security threat for a user device, according to an example embodiment. The graph 700 includes nodes BI701-BI727 representing behavior indicators included in this security threat. The graph 700 also includes a plurality of edges connecting the nodes. Weights are assigned to the edges to indicate co-occurrences of the nodes such that the edges have different widths. The graph 700 includes two nodes BI714 and BI719 that have no edge connected to them. Each of the edges is also assigned a direction represented by an arrow. As can be seen in FIG. 7, this particular threat includes a center behavior indicator represented by a node BI701. Other nodes are scattering around this center node. The directions of the edges are mostly pointing from the center node BI701 to the surrounding nodes. This indicates that the threat of the behavior indicator represented by the center node BI701 most likely occurs (in time) before other diverse behavior indicators representing by the surrounding nodes, and that the diverse behavior indicators represented by the surrounding nodes seldom co-occur with each other in one incident.

Figure 8:
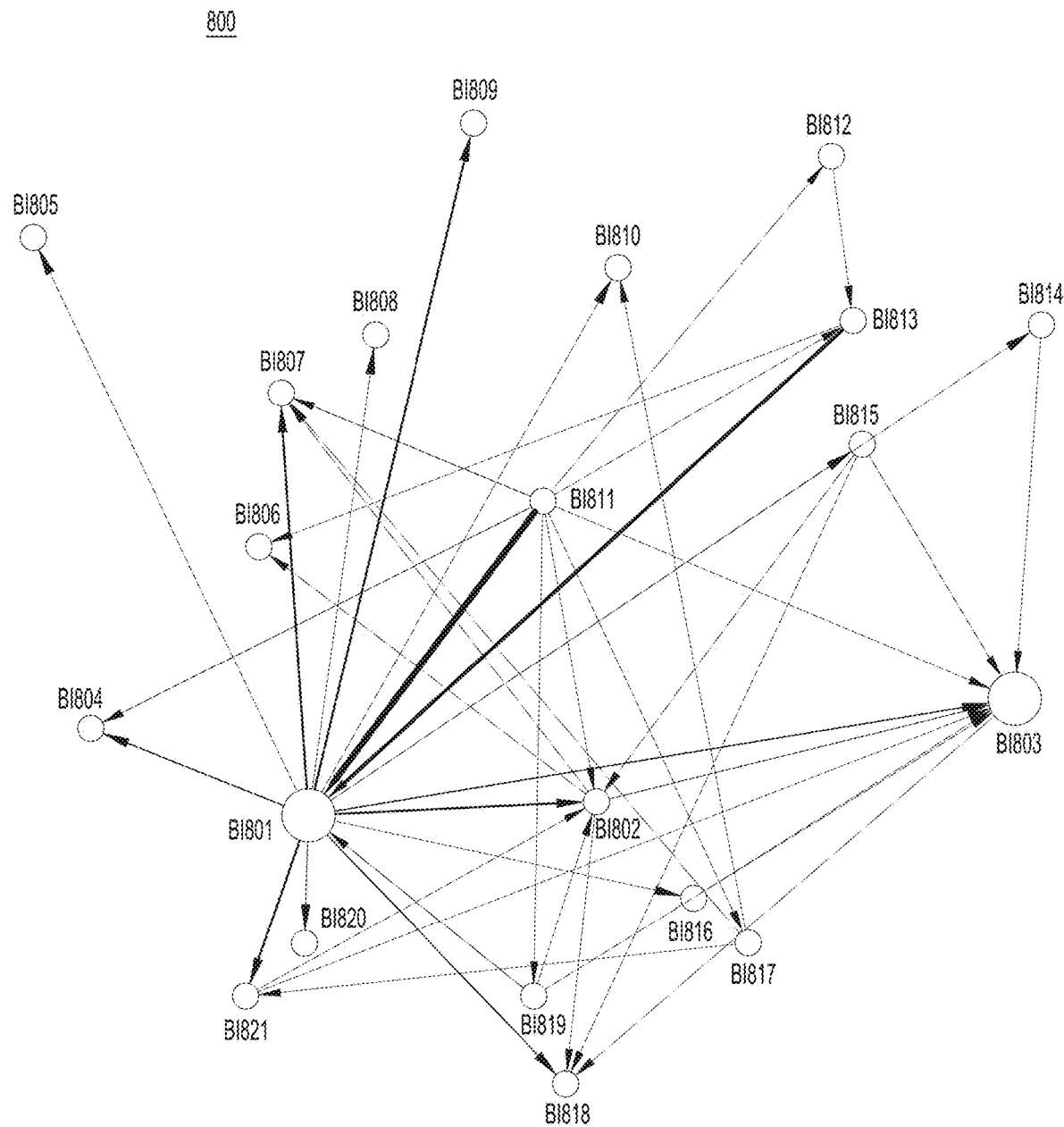
FIG. 8 illustrates a graph generated using the techniques disclosed herein for a type of security threat for a user device, according to an example embodiment.

FIG. 8 is a graph 800 generated using the techniques disclosed herein for a type of security threat for a user device, according to an example embodiment. The graph 800 includes nodes BI801-BI821 representing behavior indicators included in this security threat. The graph 800 also includes a plurality of edges that are assigned weights and directions. The graph 800 shows that this type of security threat can have various behaviors. One characteristic of the graph 800 is that it includes several central nodes, such as BI801, BI802, and BI803.

Figure 9:
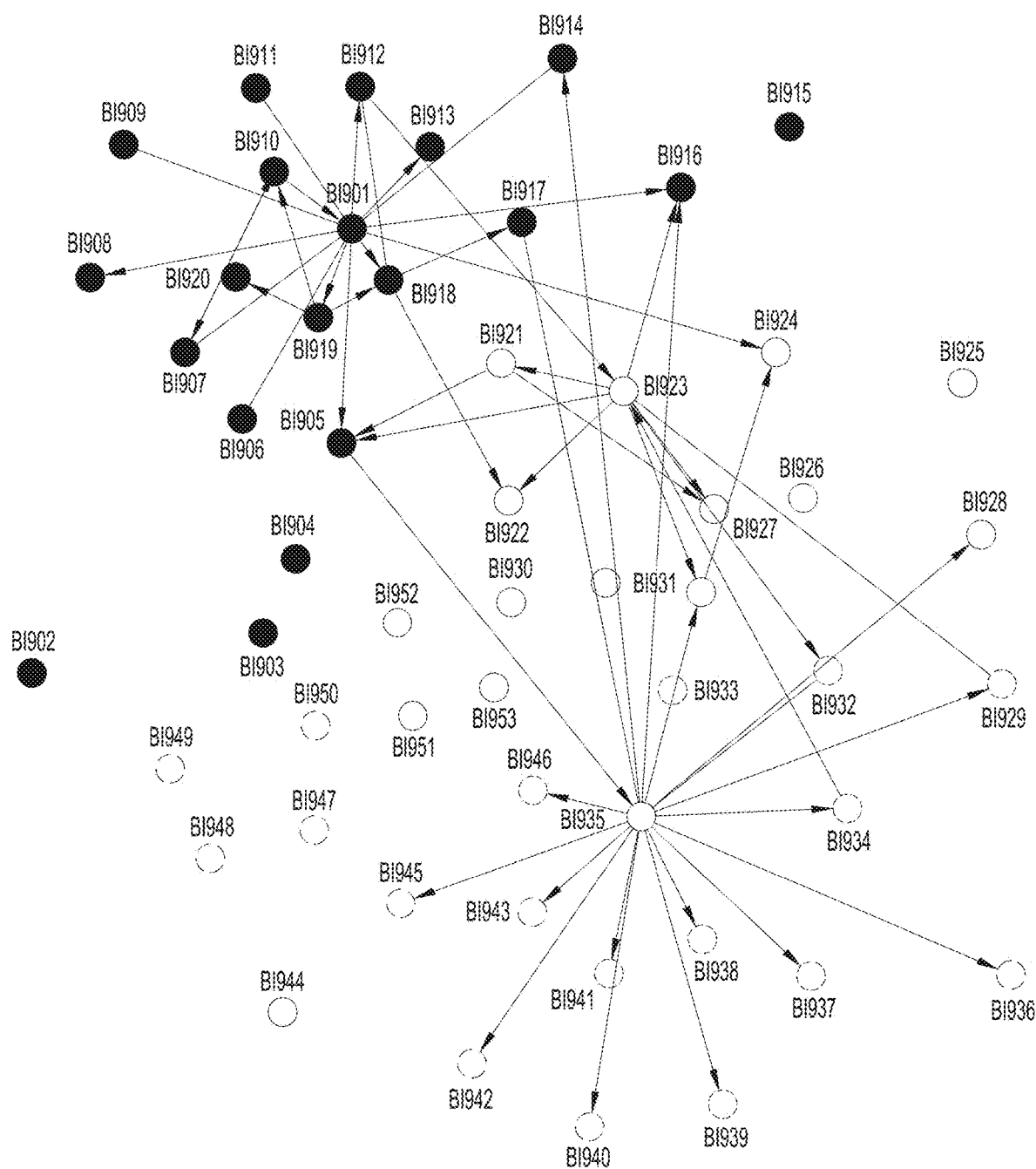
FIG. 9 illustrates a graph generated using the techniques disclosed herein for a plurality of types of security threats for a user device, according to an example embodiment.

FIG. 9 is a graph 900 generated using the techniques disclosed herein for a plurality of types of security threats for a user device, according to an example embodiment. This particular graph 900 includes behavior indicators BI901-BI953 represented by three types of nodes: solid nodes, hollow nodes with a continuous line, and hollow nodes with a dash line. This indicates that the user device is infected by three different types of security threats. The security threat represented by the hollow nodes with a dash line has a center node BI935 and a plurality of surrounding nodes, similar to that of FIG. 7. The graph 900 includes several isolated nodes that have no edge connected to them, and as explained above, these nodes are less useful behavior indicators detected by a threat detection system/server.

The techniques disclosed herein help to provide improved contextual information for understanding network security threats. The improved contextual information may also reflect the functions of a threat detection system and its configuration. The improved contextual information provides better understanding of security incidents and can save time in analyzing security threats.

The techniques disclosed herein enable automatic explanation of threat campaigns by providing visibility into how individual threat detectors/classifiers inside an IDS contribute to detection of a threat. The techniques include presenting the time order in which behavior indicators, i.e., output of threat detectors/classifiers, are observed in an incident. The techniques can detect redundant classifiers and assess usefulness of individual threat detectors/classifiers in relation to a threat campaign.

In one aspect, a method is provided. The method includes, at a server in a network: detecting, for a user device, network incidents relating to one or more security threats in the network using a plurality of threat detectors over a predetermined time period, each of the network incidents including one or more behavior indicators; assigning the network incidents into one or more groups, wherein each group corresponds to a type of security threat; generating a graph for a particular group of the user device, wherein the graph includes a plurality of nodes each representing a behavior indicator detected by a corresponding one of the plurality of threat detectors in the particular group, and wherein generating the graph includes assigning an edge to connect two nodes of the plurality of nodes if the two nodes correspond to behavior indicators that belong to a same network incident and assigning no edge to connect two nodes of the plurality of nodes if the two nodes correspond to behavior indicators that do not belong to a same network incident; and displaying the graph on a graphical user interface for a user.

In another aspect, an apparatus is provided. The apparatus includes a network interface that enables network communications, a processor, and a memory to store data and instructions executable by the processor. The processor is configured to execute the instructions to: detect, for a user device, network incidents relating to one or more security threats in a network using a plurality of threat detectors over a predetermined time period, each of the network incidents including one or more behavior indicators; assign the network incidents into one or more groups, wherein each group corresponds to a type of security threat; generate a graph for a particular group of the user device, wherein the graph includes a plurality of nodes each representing a behavior indicator detected by a corresponding one of the plurality of threat detectors in the particular group, and wherein generating the graph includes assigning an edge to connect two nodes of the plurality of nodes if the two nodes correspond to behavior indicators that belong to a same network incident and assigning no edge to connect two nodes of the plurality of nodes if the two nodes correspond to behavior indicators that do not belong to a same network incident; and display the graph on a graphical user interface for a user.

In yet another aspect, one or more non-transitory computer-readable storage media are provided. The one or more non-transitory computer-readable storage media are encoded with software comprising computer executable instructions which, when executed by a processor, cause the processor to: detect, for a user device, network incidents relating to one or more security threats in a network using a plurality of threat detectors over a predetermined time period, each of the network incidents including one or more behavior indicators; assign the network incidents into one or more groups, wherein each group corresponds to a type of security threat; generate a graph for a particular group of the user device, wherein the graph includes a plurality of nodes each representing a behavior indicator detected by a corresponding one of the plurality of threat detectors in the particular group, and wherein generating the graph includes assigning an edge to connect two nodes of the plurality of nodes if the two nodes correspond to behavior indicators that belong to a same network incident and assigning no edge to connect two nodes of the plurality of nodes if the two nodes correspond to behavior indicators that do not belong to a same network incident; and display the graph on a graphical user interface for a user.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   detecting network incidents associated with a user device, the network incidents relating to security threats in a network;
   grouping the network incidents into one or more groups based on types of the security threats associated with the network incidents;
   generating a graph for a group of the one or more groups, the graph including a plurality of nodes, each node representing a behavior indicator associated with the group, wherein generating the graph includes:
      assigning an edge to connect a first node and a second node when the first node and the second node correspond to behavior indicators that belong to a same network incident, and
      assigning a weight to the edge based on a number of co-occurrences of the first node and the second node in the group; and
   displaying the graph on a graphical user interface.

2. The method of claim 1, further comprising:
   removing the edge from the graph when the weight of the edge is less than a threshold weight.

3. The method of claim 1, further comprising:
   removing, from the graph, a particular node in a particular group corresponding to a particular behavior indicator that is included in a network incident and is not included in any other network incident of the particular group.

4. The method of claim 1, wherein detecting the network incidents comprises:
   detecting the network incidents using a plurality of threat detectors over a predetermined time period.

5. The method of claim 4, further comprising:
   identifying one or more redundant threat detectors among the plurality of threat detectors based on the weight of the edge; and
   disabling the one or more redundant threat detectors.

6. The method of claim 1, further comprising:
   assigning a direction to the edge based on a time order of occurrence of the first node and the second node in the graph.

7. The method of claim 1, further comprising:
   ordering behavior indicators in each network incident based on occurrences of the behavior indicators in time to generate a behavior indicator sequence for each network incident; and
   identifying a particular behavior indicator sequence among behavior indicator sequences for the one or more groups as a threat-related sequence based on co-occurrence of behavior indicators in the particular behavior indicator sequence.

8. An apparatus comprising:
   a memory;
   a network interface configured to enable network communication; and
   a processor, wherein the processor is configured to perform operations comprising:
      detecting network incidents associated with a user device, the network incidents relating to security threats in a network;
      grouping the network incidents into one or more groups based on types of the security threats associated with the network incidents;
      generating a graph for a group of the one or more groups, the graph including a plurality of nodes, each node representing a behavior indicator associated with the group, wherein the processor is configured to perform the operation of generating the graph by:
         assigning an edge to connect a first node and a second node when the first node and the second node correspond to behavior indicators that belong to a same network incident, and assigning a weight to the edge based on a number of co-occurrences of the first node and the second node in the group; and displaying the graph on a graphical user interface.

9. The apparatus of claim 8, wherein the processor is further configured to perform operations comprising:

removing the edge from the graph when the weight of the edge is less than a threshold weight.

10. The apparatus of claim 8, wherein the processor is further configured to perform operations comprising:

removing, from the graph, a particular node in a particular group corresponding to a particular behavior indicator that is included in a network incident and is not included in any other network incident of the particular group.

11. The apparatus of claim 8, wherein the processor is configured to perform the operation of detecting the network incidents by:

detecting the network incidents using a plurality of threat detectors over a predetermined time period.

12. The apparatus of claim 11, wherein the processor is further configured to perform operations comprising:

identifying one or more redundant threat detectors among the plurality of threat detectors based on the weight of the edge; and disabling the one or more redundant threat detectors.

13. The apparatus of claim 8, wherein the processor is further configured to perform operations comprising:

assigning a direction to the edge based on a time order of occurrence of the first node and the second node in the graph.

14. The apparatus of claim 8, wherein the processor is further configured to perform operations comprising:

ordering behavior indicators in each network incident based on occurrences of the behavior indicators in time to generate a behavior indicator sequence for each network incident; and identifying a particular behavior indicator sequence among behavior indicator sequences for the one or more groups as a threat-related sequence based on co-occurrence of behavior indicators in the particular behavior indicator sequence.

15. One or more non-transitory computer readable storage media encoded with instructions that, when executed by a processor, cause the processor to execute a method comprising:

detecting network incidents associated with a user device, the network incidents relating to security threats in a network;

grouping the network incidents into one or more groups based on types of the security threats associated with the network incidents;

generating a graph for a group of the one or more groups, the graph including a plurality of nodes, each node representing a behavior indicator associated with the group, wherein generating the graph includes:

assigning an edge to connect a first node and a second node when the first node and the second node correspond to behavior indicators that belong to a same network incident, and assigning a weight to the edge based on a number of co-occurrences of the first node and the second node in the group; and displaying the graph on a graphical user interface.

16. The one or more non-transitory computer readable storage media of claim 15, wherein the method further comprises:

removing the edge from the graph when the weight of the edge is less than a threshold weight.

17. The one or more non-transitory computer readable storage media of claim 15, wherein the method further comprises:

removing, from the graph, a particular node in a particular group corresponding to a particular behavior indicator that is included in a network incident and is not included in any other network incident of the particular group.

18. The one or more non-transitory computer readable storage media of claim 15, wherein detecting the network incidents comprises:

detecting the network incidents using a plurality of threat detectors over a predetermined time period.

19. The one or more non-transitory computer readable storage media of claim 18, the method further comprising:

identifying one or more redundant threat detectors among the plurality of threat detectors based on the weight of the edge; and disabling the one or more redundant threat detectors.

20. The one or more non-transitory computer readable storage media of claim 15, the method further comprising:

assigning a direction to the edge based on a time order of occurrence of the first node and the second node in the graph.

* * * * *